United States Patent

Neubauer

(10) Patent No.: US 7,657,231 B2
(45) Date of Patent: Feb. 2, 2010

(54) METHOD FOR ESTIMATING A FREQUENCY OFFSET OF A MODULATED BANDPASS SIGNAL

(75) Inventor: André Neubauer, Krefeld (DE)

(73) Assignee: Infineon Technologies AG, Neubiberg (DE)

( * ) Notice: Subject to any disclaimer, the term of this patent is extended or adjusted under 35 U.S.C. 154(b) by 558 days.

(21) Appl. No.: 11/379,344

(22) Filed: Apr. 19, 2006

(65) Prior Publication Data
US 2007/0011219 A1 Jan. 11, 2007

Related U.S. Application Data

(63) Continuation of application No. PCT/DE2004/002299, filed on Oct. 15, 2004.

(30) Foreign Application Priority Data
Oct. 21, 2003 (DE) ................. 103 48 846

(51) Int. Cl.
*G06F 17/14* (2006.01)
(52) U.S. Cl. .................. 455/67.11; 708/400
(58) Field of Classification Search .......... 455/205, 455/210, 214, 320, 322, 334, 337; 375/268, 375/271, 320, 322, 324, 327, 329, 340, 373
See application file for complete search history.

(56) References Cited

U.S. PATENT DOCUMENTS

| | | | | |
|---|---|---|---|---|
| 3,947,633 A | * | 3/1976 | Burger | 375/323 |
| 4,485,347 A | * | 11/1984 | Hirasawa et al. | 329/303 |
| 5,313,493 A | * | 5/1994 | Dutta | 375/283 |
| 5,566,100 A | * | 10/1996 | Lu | 708/309 |
| 6,768,780 B1 | * | 7/2004 | Lakkis et al. | 375/355 |
| 7,106,807 B2 | * | 9/2006 | Neubauer | 375/305 |
| 7,397,427 B1 | * | 7/2008 | Rhoads et al. | 342/442 |
| 2003/0100278 A1 | * | 5/2003 | Devaney et al. | 455/131 |
| 2003/0108121 A1 | * | 6/2003 | Neubauer | 375/305 |
| 2004/0029599 A1 | * | 2/2004 | Mehrgardt et al. | 455/466 |
| 2005/0201490 A1 | * | 9/2005 | Scholand et al. | 375/322 |

FOREIGN PATENT DOCUMENTS

DE 199 61 123 A1 7/2001

(Continued)

OTHER PUBLICATIONS

International Search Report; PCT/DE2004/002299, 13 Pgs, Apr. 12, 2005.

(Continued)

*Primary Examiner*—Matthew D Anderson
*Assistant Examiner*—Erica Fleming-Hall
(74) *Attorney, Agent, or Firm*—Dicke, Billig & Czaja, PLLC

(57) ABSTRACT

In a method for estimating a frequency offset ($f_e$, $\Omega_e$) of a modulated bandpass signal (s) with an assumed carrier frequency ($\Omega_0$) in a mobile radio receiver, times ($\tau_j$) of the zero cross-overs of the bandpass signal are determined in a first step. Using the times ($\tau_j$) of the zero cross-overs and the assumed carrier frequency ($\Omega_0$), the required frequency offset ($f_e$, $\Omega_e$) is estimated in a further step by calculating the DC component of an instantaneous frequency which is given by the frequency of the bandpass signal less the assumed carrier frequency.

19 Claims, 2 Drawing Sheets

FOREIGN PATENT DOCUMENTS

DE            101 03 479 A1    8/2002
WO        WO 01/45339 A2    6/2001

OTHER PUBLICATIONS

A. Neubauer; "Irreguläre Abtastung"; Springer Verlag, Berlin, pp. 375-377 & 396-404, Apr. 2003.

F. Marvasti; "The Reconstruction of a SIgnal from the Zero Crossings of an FM Signal"; The Transactions of the Institute of Electronics and Communication Engineers of Japan; Section E; Institute of Electronics and Communication Engineers of Japan; Tokyo, Japan; vol. E68, No. 10; p. 650, Oct. 1985.

T. Scholand et al.; "Bluetooth Receiver Based on Zero-Crossing Demodulation"; Electronics Letters, IEE Stevenage, GB; vol. 39, No. 4; pp. 397-398, Feb. 2003.

U. Mengali et al., "Synchronization Techniques for Digital Receivers," Plenum Press: New York, pp. 77-99, 1997.

\* cited by examiner

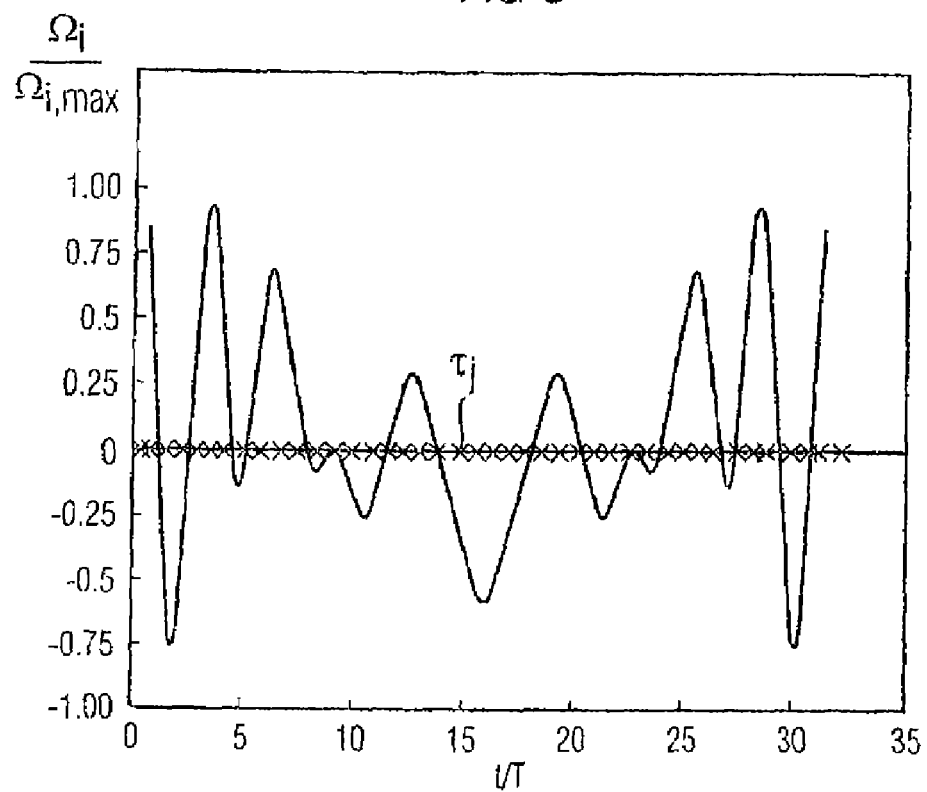
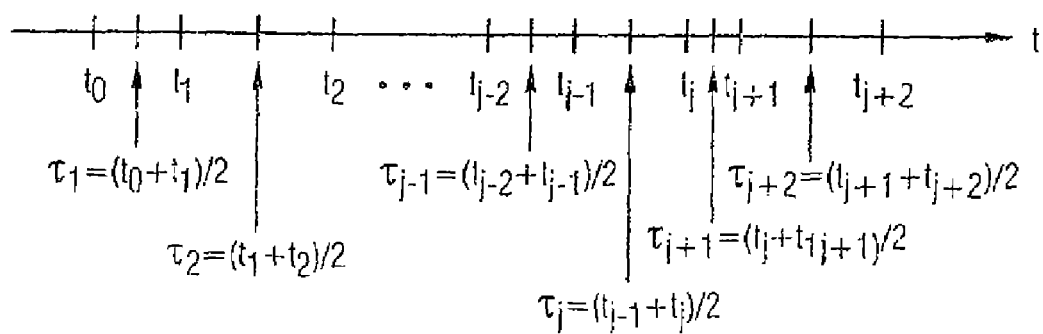

METHOD FOR ESTIMATING A FREQUENCY OFFSET OF A MODULATED BANDPASS SIGNAL

CROSS-REFERENCE TO RELATED APPLICATION

This application is a continuation of co-pending International Application No. PCT/DE2004/002299 filed Oct. 15, 2004, which designates the United States, and claims priority to German application number DE 103 48 846.4 filed Oct. 21, 2003.

TECHNICAL FIELD

The present invention relates to a method and to a device for estimating a frequency offset of a bandpass signal, modulated with a modulation signal, with a carrier frequency in a mobile radio receiver.

BACKGROUND

Apart from symbol and frame synchronization, digital receiver systems for wireless transmission systems require the estimation and correction of a phase offset and of a frequency offset for the correct and power-efficient detection of the transmitted symbols.

For the digital frequency offset estimation, heuristic methods are used which utilize known signal characteristics or characteristics of signals derived from the received signal, and methods which are based on the so-called maximum likelihood principle. In these methods, a basic distinction is made between data-aided and non-data-aided methods and clock-aided and non-clock-aided methods. Furthermore, estimating methods with or without feedback (feedback or feedforward) are known. All of these methods are based on the use of the complex envelope of the received signal which is analog/digital-converted with adequate resolution.

From the text book "Synchronization Techniques For Digital Receivers", U. Mengali and A. N. D'Andrea, Plenum Press, New York, 1997, a heuristic method is known which works in accordance with the so-called "delay-and-multiply" method. In this method, an intermediate signal is generated from the product of a sampled input signal in complex form and a conjugate-complex input signal, displaced in time with respect to the former. Evaluation of this intermediate signal over an observation interval comprising N received symbols results in the required frequency offset. In the method, a differential demodulator is used as essential component. The disadvantageous factor in such a method is that an analog/digital converter operating with adequate resolution is necessary for sampling the input signal. In addition, gain control of the analog input signal is required apart from the linearity of the analog preprocessing.

From PCT Publication WO 01/45339 A2, a further method for estimating a frequency offset is known which is based on the above-mentioned method. In this document, an improved estimation of the frequency offset in CPFSK-modulated (continuous phase frequency shift keying) input signals is proposed by taking into consideration an additional delay parameter D. This method also exhibits the above-mentioned disadvantages.

For short-range wireless transmission systems such as are provided, for example, in the Bluetooth standard, so-called limiter-discriminator receiver concepts are known in which the received analog signal (possibly down-converted into a suitable intermediate frequency range) is converted into a hard-limited value-discrete 1-bit signal by using a limiter. The further signal processing is only based on this 1-bit signal. This concept is very interesting from points of view of economy since it is possible to dispense with an (expensive) analog/digital converter for quantizing the received analog signal. However, the procedures for frequency-offset estimation, explained above, cannot be used since there are no samples of the received analog signal which are obtained with adequate resolution.

From the text book "Irreguläre Abtastung (irregular sampling)", A. Neubauer, Springer-Verlag 2003, as described in chapter 8.2.2, pages 402 to 404, and algorithm 7.11, pages 375 to 377, a method is known which enables the instantaneous frequency of a modulation signal to be reconstructed by only evaluating the zero cross-overs of the modulated bandpass signal. For this purpose, the times of the zero cross-overs of the modulated bandpass signal are first determined. From the values of two adjacent times, the local mean value of the instantaneous frequency of the modulation signal between these adjacent times can be determined when the carrier frequency is known. A reconstruction of the required instantaneous frequency can then be performed via a multiplicity of local mean values with the aid of a Fourier series expansion of the instantaneous frequency. In this context, a recursive method for determining the corresponding Fourier coefficients is proposed. The Fourier series expansion of the instantaneous frequency then results in the required variation with time of the instantaneous frequency.

SUMMARY

The invention is based on the object of specifying a method for estimating a frequency offset of a bandpass signal, modulated with a modulation signal, for a mobile radio receiver which can be implemented inexpensively and, in particular, makes little demands on the implementation with regard to the analog and mixed-signal (both analog and digital) receiver components. Furthermore, the invention has the aim of specifying a corresponding device.

The method according to the invention for estimating a frequency offset of a bandpass signal, modulated with a modulation signal, with an assumed carrier frequency in a mobile radio receiver is arranged in the following steps: in a first step, times of the zero cross-overs of the bandpass signal are determined. Using the times of the zero cross-overs and the assumed carrier frequency, the required frequency offset is estimated in a further step by calculating the DC component of an instantaneous frequency which is given by the frequency of the modulated bandpass signal less the assumed carrier frequency.

The method provides the advantage that, apart from the assumption of a carrier frequency, only the times of the zero cross-overs of the modulated bandpass signal are necessary for determining the frequency offset. Since the times of the zero cross-overs remain unchanged due to non-linear amplification, the method can be implemented inexpensively by means of a receiver based on a non-linear limiting amplifier (or limiter). In addition, the gain of a limiting amplifier is very high and the output level is limited so that the necessity for automatic gain control (AGC) is additionally dispensed with in such a receiver. Sampling of the amplified input signal by means of an analog/digital converter operating with high resolution as in other methods is not necessary since only a 1-bit amplitude information item is required for detecting the zero cross-overs of the amplified signal. The 1-bit amplitude information item, namely whether the signal considered is greater than or less than zero, can be determined by means of a simple comparator instead of a high-resolution analog/digital converter. The method according to the invention thus provides a significant cost advantage with regard to the implementation of the receiver. The complexity of implementation is shifted from the analog or mixed-signal domain into the purely digital domain. Furthermore, frequency correction is only made possible by the method according to the invention without additional constructional expenditure (analog/digital converter) in inexpensive receivers based on the limiter/discriminator principle.

In principle, a distinction can be made between two types of frequency offset: on the one hand, the frequency offset can be a frequency offset between an assumed carrier frequency and an actual carrier frequency on the receiver. This is attributable, for example, to a detuning of the transmit carrier frequency PLL or receive carrier frequency PLL (phase-locked loop) or to a Doppler frequency shift. In addition, it is possible that the modulation signal exhibits an average frequency which differs from zero over a certain observation period, for example during the transmission of data sequences which are not free of DC component. In the determination of the frequency offset according to the invention, frequency errors based on both causes are detected.

In the present document, the term "frequency" is frequently used both for the angular frequency specified by the formula symbol "$\Omega$" and for the frequency in its actual meaning, specified by the formula symbol "f". If a distinction is made between the frequency and the angular frequency, statements made with regard to the angular frequency $\Omega$ also apply to the frequency f, and conversely, taking into consideration the proportionality factor "$2\pi$".

Advantageously, for estimating the DC component of the instantaneous frequency, a number of local changes of a phase, which is given by the phase of the modulated bandpass signal (s) less the phase ($f_0$, $\Omega_0$) caused by the assumed carrier frequency, are determined between in each case two adjacent times with the aid of the values of these times. It is of advantage here, for estimating the DC component of the instantaneous frequency, if a number of local changes of the phase between in each case adjacent times are added.

This provides the advantage that the DC component of the instantaneous frequency in an observation time interval can be determined by adding individual phase changes. The individual phase changes can be calculated in each case only by means of the values of the times of the zero cross-overs and of the assumed carrier frequency.

The local change in the phase is preferably determined via the calculation of the expression:

$$\pi - \Omega_0 \cdot (\tau_{j+1} - \tau_j) \quad (1),$$

where $\Omega_0$ is the assumed angular carrier frequency and $\tau_j$ and $\tau_{j+1}$ are two adjacent times of the zero cross-overs.

Preferably, the estimated DC component of the instantaneous frequency is determined directly from the 0th coefficient of the Fourier series expansion of the instantaneous frequency. No further Fourier coefficients need to be determined.

Advantageously, the amplitude of the bandpass signal is evaluated with regard to two amplitude states for determining the times of the zero cross-overs. Such evaluation of the amplitude enables the analog information of the signal shape to be reduced to a minimum without losing the information of the time of the zero cross-overs. The implementation can be provided by a comparator which represents a 1-bit amplitude decider. No high-resolution analog/digital conversion is necessary.

It is of advantage here if a limiting amplification of the bandpass signal is performed for evaluating the amplitude. As already stated above, the times of the zero cross-overs are not influenced by limiting amplification. The method can thus be implemented inexpensively by means of a receiver based on a limiting amplifier (limiter). Since the gain of a limiting amplifier is very high and, moreover, the output level of the amplifier is limited to a maximum value, there is additionally no necessity for AGC gain control in such a receiver. Thus, the method according to the invention enables a frequency offset in the analog modulated bandpass signal to be inferred only by means of the 1-bit signal output by a limiter.

The device according to the invention for estimating the frequency offset is characterized by a zero cross-over detector for determining the times of the zero cross-overs of the bandpass signal and by a means for estimating the frequency offset by calculating the DC component of the instantaneous frequency which is given by the frequency of the modulated bandpass signal less the assumed carrier frequency. The means for estimating the frequency offset needs the measured times of the zero cross-overs and the assumed carrier frequency as input parameters.

BRIEF DESCRIPTION OF THE DRAWINGS

In the text which follows, the invention will be explained in greater detail by means of an exemplary embodiment, referring to the drawings, in which:

FIG. 2 shows a diagram of the variation of a modulated bandpass signal s (continuous curve) and of the binary amplitude-decided signal $s_b$ (dashed curve) with two times of the zero cross-overs $\tau_j$ and $\tau_{j+1}$ drawn in;

FIG. 3 shows a diagram of an exemplary variation of an instantaneous frequency $\Omega_i$ with a sequence $\{t_j\}$ of auxiliary times drawn in; and FIG. 4 shows a time line with the times of the zero cross-overs $\tau_j$ and the corresponding auxiliary times $t_j$.

DETAILED DESCRIPTION

Figure 1:
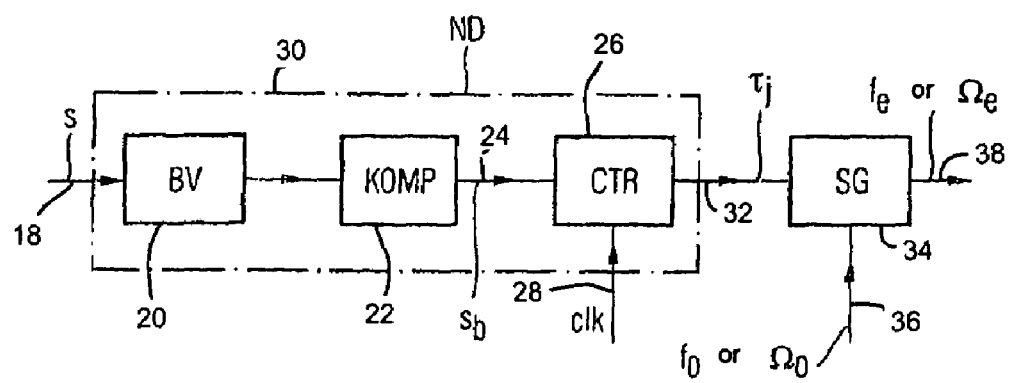
FIG. 1 shows an embodiment of the device according to the invention for estimating the frequency offset.

FIG. 1 shows an embodiment of the device according to the invention for estimating the frequency offset. In a radio-frequency circuit section of the receiver (not shown), a received modulated bandpass signal with a carrier frequency $f_{RF} = \Omega_{RF}/2\pi$ is converted into a modulated bandpass signal s indicated at 18 with a carrier frequency $f_0 = \Omega_0/2\pi$ (also called intermediate frequency), where $f_0 < f_{RF}$ holds true. This signal is supplied to a limiting amplifier BV indicated at 20. The output signal of the limiting amplifier BV is used as input signal for a comparator KOMP indicated at 22. The output signal $s_b$ indicated at 24 of the comparator KOMP is supplied to a counter CTR indicated at 26. In addition, a clock signal clk indicated at 28 is fed into the counter CTR. The limiting amplifier By, the comparator KOMP and the counter CTR form a zero cross-over detector ND indicated at 30. The zero cross-over detector ND supplies at its output. indicated at 32. detected times of the zero cross-overs $\tau_j$ of the modulated bandpass signal or intermediate-frequency signal, respectively. The times of the zero cross-overs $\tau_j$ are used as input signal to an estimator SG indicated at 34 of the DC component of the instantaneous frequency. In addition, the estimator SG uses the assumed intermediate frequency $f_0$ or $\Omega_0$ as input variable indicated at 36. At its output indicated at 38, the estimator supplies an estimated value for the frequency offset $f_e$ or $\Omega_e$.

The circuit of the comparator KOMP and of the limiting amplifier BV can be implemented in a single circuit. In addition, the output signal of the limiting amplifier BV, with correspondingly high gain and correspondingly high input level, can be so great that a comparator KOMP is not necessary. Conversely, it may be possible to dispense with the limiting amplifier BV if the signal deviation at the input of the comparator KOMP is sufficiently high. It is only of importance that the input signal $s_b$ of the counter CTR has the steepest possible edges and thus is already amplitude-decided in a binary manner. In this regard, it would also be possible to replace the comparator KOMP having a time-continuous output signal by a comparator having a time-discrete output signal, that is to say a 1-bit analog/digital converter.

The signal $s_b$ is used for resetting the counter CTR, which counts the clock pulse of the clock signal clk with constant clock frequency, with each zero cross-over. The count reached then corresponds to the respective time $\tau_j$ of the zero cross-over. The estimator SG carries out a calculation of the DC component of the instantaneous frequency according to the calculation rules specified later, with the aid of these times $\tau_j$ and the assumed intermediate frequency $f_0$ or $\Omega_0$ alone, which results in the required frequency offset $f_e$ or $\Omega_e$.

In principle, it would also be conceivable to dispense with a separate radio-frequency circuit section which downconverts the received bandpass signal with a carrier frequency $f_{RF}=\Omega_{RF}/2\pi$ into a modulated bandpass signal s with a carrier frequency $f_0=\Omega_0/2\pi$. In this case, the carrier frequency of the bandpass signal s would correspond to the carrier frequency $f_{RF}=\Omega_{RF}/2\pi$ of the transmitted signal.

Figure 2:
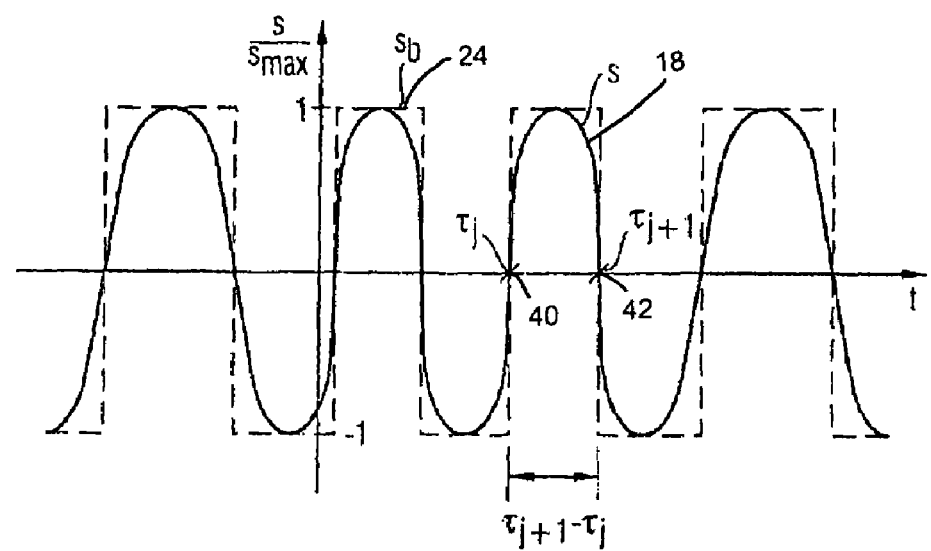

FIG. 2 shows the variations of a modulated bandpass signal s indicated at 18 (continuous curve) and the resultant binary amplitude-decided signal $s_b$ indicated at 24 (dashed curve) and two times of the zero cross-overs $\tau_j$ indicated at 40 and $\tau_{j+1}$ indicated at 42 drawn in. The detected times of the zero cross-overs $\tau_j$ form the starting point for determining the frequency offset $f_e$ or $\Omega_e$, respectively.

To calculate the frequency error according to the invention, a mathematical formalism is used which is represented in the text book "Irreguläre Abtastung" mentioned with regard to the prior art in the introduction to the description. This formalism specifies how the instantaneous frequency of a modulation signal can be reconstructed only by knowing the zero cross-overs, recorded over a certain observation period, of a frequency-error-free modulated bandpass signal and the carrier frequency. The content of the passage in chapter 8.2, pages 396 to 404 and of the passage with the algorithm 7.11, pages 375 to 377 is herewith incorporated into the content of the disclosure of the present patent application by referring to it.

In the text which follows, the mathematical formalism specified in the above text book will be reproduced: a modulated bandpass signal s free of frequency errors is considered, see FIG. 2. For example, a CPFSK modulation method can be used. In this modulation method, the binary symbol sequence $\{d_k\}$ to be transmitted, with $d_k \in \{-1, 1\}$, is modulated onto a carrier signal so that the following modulated bandpass signal s is obtained:

$$s(t) = \cos\left(\Omega_0 \cdot t + \phi_0 + \pi \cdot \eta \sum_{k=-\infty}^{\infty} d_k \cdot q(t - k \cdot T_{sym})\right) \quad (2)$$

where $\Omega_0$ is the carrier frequency (band center frequency), $\phi_0$ is a zero phase angle, generally not known, $\eta$ is the modulation index and $T_{sym}$ is the symbol period of a symbol $d_k$. The amplitude of the bandpass signal is assumed as 1 in simplification, without restricting the general applicability. The signal q is defined over the pulse shaping p according to $$q(t) = \frac{1}{T_{sym}} \int_{-\infty}^{t} p(t')dt'. \quad (3)$$

The pulse shaping p is dependent on the type of modulation. For example, a Gaussian pulse shaping is performed with GFSK (Gaussian frequency shift keying), the pulse extending over more than only the symbol period $T_{sym}$ in time per symbol.

With the so-called instantaneous phase $\phi_i$ of the modulation signal $$\phi_i(t) = \pi \cdot \eta \sum_{k=-\infty}^{\infty} d_k \cdot q(t - k \cdot T_{sym}) \quad (4)$$

the modulated bandpass signal s is obtained as $$s(t) = \cos(\Omega_0 \cdot t + \phi_0 + \phi_i(t)). \quad (5a)$$

The index i of the instantaneous phase is not a counting index but only stands for "instant" here and in the text which follows.

As is found by setting the right-hand side of equation (5a) to zero, the following applies to the times of the zero cross-overs $\tau_j$ of the signal s:

$$\Omega_0 \cdot \tau_j + \phi_0 + \phi_i(\tau_j) = (2 \cdot j - 1) \cdot \frac{\pi}{2}. \quad (6)$$

The phase of the modulation signal at a zero cross-over is thus $$\phi_i(\tau_j) = (2 \cdot j - 1) \cdot \frac{\pi}{2} - \Omega_0 \cdot \tau_j - \phi_0. \quad (7)$$

The following then applies to the phase difference of the modulation signal between two successive zero cross-overs:

$$\phi_i(\tau_{j+1}) - \phi_i(\tau_j) = \int_{\tau_j}^{\tau_{j+1}} \Omega_i(t)dt = \pi - \Omega_0 \cdot (\tau_{j+1} - \tau_j) \quad (8)$$

where $\Omega_i$ is the instantaneous frequency of the modulation signal, where the instantaneous frequency $\Omega_i$ and the phase of the modulation signal $\phi_i$ are linked via $$\Omega_i(t) = \frac{d}{dt}\phi_i(t). \quad (9)$$

From equation (8) it can be seen that with a known carrier frequency $\Omega_0$, the change in the phase of the modulation signal, defined as the definite integral over the instantaneous frequency between times $\tau_j$ and $\tau_{j+1}$, can be calculated from the adjacent times of the zero cross-overs $\tau_j$ and $\tau_{j+1}$.

Via the equation $$\int_{\frac{t_{j-1}+t_j}{2}}^{\frac{t_j+t_{j+1}}{2}} f_i(t)\,dt = \frac{1}{2\pi}\int_{\tau_j}^{\tau_{j+1}} \Omega_i(t)\,dt \qquad (10)$$

with $f_i(t)=\Omega_i(t)/2\pi$, an irregular sequence $\{t_j\}$ of non-equidistant auxiliary times is defined from the sequence $\{\tau_j\}$ of the measured times of the zero cross-overs. With $$\tau_j = \frac{t_j + t_{j-1}}{2} \qquad (11)$$

the non-equidistant auxiliary times $t_j$ are obtained recursively in accordance with the following equation $$t_j = 2\tau_j - t_{j-1}. \qquad (12)$$

An initial time $t_0$ must be selected here.

FIG. 3 shows an exemplary variation of the instantaneous frequency $\Omega_i$. The non-equidistant auxiliary times $t_j$ are marked by crosses on the x axis.

FIG. 4 graphically shows how the auxiliary times $t_j$ are related to the times of the zero cross-overs $\tau_j$ according to equation (11) and (12).

It is possible to determine the function of the instantaneous frequency $f_i(t)$ via the reconstruction algorithm specified in the text which follows—which is represented in detail in the text book "Irreguläre Abtastung", algorithm 7.11, pages 375 to 377.

This algorithm is based on an iterative Fourier series expansion with the initialization $f_{i,0}=0$ according to $$f_{i,n}(t) = \sum_{m=-\lfloor M/2 \rfloor}^{\lfloor M/2 \rfloor} c_{m,n} \cdot e^{i2\pi mt/NT} \qquad (13)$$

using the recursively calculated math Fourier coefficients $$c_{m,n} = c_{m,n-1} + \sum_j \left[(Lf_i)_j - (L_{n-1}f_i)_j\right] \cdot e^{-i2\pi m t_j/NT} \qquad (14)$$

where n designates the index of recursion.

The value for M is obtained in accordance with a frequency limit $$\Omega_g = \frac{\pi M}{T \cdot N} \qquad (15)$$

to the periodic continuation of the frequency signal $f_i$, where $N\cdot T$ describes the observation period with the reference quantity T. Thus, $\Omega_g$ can be understood to be the maximum frequency of the signal $f_i$ to be reconstructed.

The auxiliary quantities $(L_n f_i)_j$ and $(Lf_i)_j$ are defined according to $$(L_n f_i)_j = \sum_{k=-\lfloor M/2 \rfloor}^{\lfloor M/2 \rfloor} c_{k,n} \cdot e^{i\pi k\left(\frac{t_{j-1}+t_j}{2}+\frac{t_j+t_{j+1}}{2}\right)/NT} \qquad (16)$$

$$\frac{w_j}{N\cdot T} \cdot \operatorname{sinc}\left(\frac{k}{N}\cdot\frac{w_j}{T}\right)$$

with $$w_j = \frac{t_{j+1}-t_{j-1}}{2} \qquad (17)$$

or, respectively, $$(Lf_i)_j = \frac{1}{N\cdot T}\int_{\frac{t_{j-1}+t_j}{2}}^{\frac{t_j+t_{j+1}}{2}} f_i(t)\,dt. \qquad (18)$$

In the text which follows, the method according to the invention for determining a frequency offset of a modulated bandpass signal is described:

If the bandpass signal s obtained by the zero cross-over detector ND exhibits a frequency offset $f_e$ or $\Omega_e$, respectively (index e="error") to be estimated with respect to the frequency-error-free signal according to equation (5a), this bandpass signal can be represented as $$s(t)=\cos(\Omega_0\cdot t+\phi_0+\phi_i(t)+2\pi f_e\cdot t). \qquad (5b)$$

Without restricting the general applicability, it is assumed that the frequency offset $f_e$ is constant with time over the observation period $N\cdot T$.

In this method, a distinction can be made basically between two types of frequency offset $f_e$:

1. The frequency offset can be obtained as frequency offset between a carrier frequency $f_0$ assumed at the receiver end and an actual carrier frequency $f_0+f_e$, on the one hand.
2. In addition, it is possible that the modulation component exhibits an average frequency differing from zero over a particular period of observation. This can be due to the fact, for example, that the occurrence of the individual symbol values is not equally distributed in the observation period, that is to say with binary modulation, the number of bits assigned to the logical 1 is greater than the number of bits assigned to the logical 0. In modern digital communication systems, however, it can be frequently assumed with good approximation that data sequences are free of DC component due to the use of so-called scramblers.

According to the invention, the 0th Fourier coefficient $c_{0,n}$ is then determined by means of the method specified in equations (6) to (18).

According to equations (14), (16), (18), (8) and (10), the 0th Fourier coefficient $c_{0,n}$ is obtained as $$c_{0,n} = c_{0,n-1} + \sum_j \left[(Lf_i)_j - (L_{n-1}f_i)_j\right] \qquad (19)$$

$$= c_{0,n-1} + \frac{1}{N\cdot T}\sum_j \left[\frac{1}{2\pi}(\pi-\Omega_0)(\tau_{j+1}-\tau_j)\right] -$$

$$\sum_{k=-\lfloor M/2 \rfloor}^{\lfloor M/2 \rfloor} c_{k,n-1}\cdot e^{i\pi k\frac{\tau_j+\tau_{j+1}}{NT}}\cdot w_j \cdot \operatorname{sinc}\left(\frac{k}{N}\frac{w_j}{T}\right)\Bigg]$$

where n designates the index of recursion, as already mentioned. As can be seen from equation (19), the higher Fourier coefficients $c_{k,n-1}$ are also used for calculating the 0th Fourier coefficient $c_{0,n}$, in addition to the Fourier coefficient $c_{0,n-1}$.

To calculate the local phase changes according to equation (8), an assumed carrier frequency, e.g. the nominal carrier frequency, or the carrier frequency to be expected, respectively (band center frequency) is used as carrier frequency $\Omega_0$.

According to equation (5b), in conjunction with equation (9), the instantaneous frequency of the modulated bandpass signal, possibly having frequency errors, is:

$$\Omega_i^{(s)} = \frac{d}{dt}(\Omega_0 t + \phi_0 + \phi_i(t) + 2\pi f_e \cdot t) \qquad (20)$$
$$= \Omega_0 + \frac{d}{dt}\phi_i(t) + 2\pi f_e.$$

An instantaneous frequency given by the frequency of the modulated bandpass signal, which possibly has frequency errors, less the assumed carrier frequency is:

$$\Omega_i^{(s)} - \Omega_0 = \frac{d}{dt}\phi_i(t) + 2\pi f_e. \qquad (21)$$

According to equations (5a) and (13), the 0th Fourier coefficient $c_{0,n}$ represents the DC component of the function $$\frac{1}{2\pi}\frac{d}{dt}\varphi_i(t) + f_e.$$

Any modulation-related frequency offset according to the cause specified at 2. should be a component of $f_e$, i.e. the DC component of $$\frac{d}{dt}\phi_i(t)$$

is zero.

The consequence is that the required frequency offset is obtained directly from the 0th Fourier coefficient calculated according to equation (19):

$$f_e = c_{0,n}. \qquad (22)$$

The calculated frequency offset $f_e$ is related to the assumed carrier frequency $\Omega_0$.

In summary, the operation of the device according to the invention for determining the frequency offset according to FIG. 1 can be summarized as follows:

a) determining the times $\tau_i$ of zero cross-overs of the bandpass signal s in the zero cross-over detector ND;
b) determining the Fourier coefficient $c_{0,n}$ at assumed carrier frequency $f_0$ or $\Omega_0$ in the estimator SG according to equation (19); and
c) determining and outputting the frequency offset from the Fourier coefficient $c_{0,n}$ in the estimator SG according to equation (22).

The distinction made at 1. and 2. with regard to the cause of the frequency offset $f_e$ cannot be performed for the receiver, the frequency offset has an identical effect at the receiver end independently of the cause of its origin. This can be understood against the background that a carrier frequency offset can also be interpreted as a DC component of the modulation and conversely. Equation (22) then specifies the frequency offset $f_e$ independently of the cause.

Using simulation calculations, it was possible to demonstrate that, as a rule, the 0th Fourier coefficient is already determined with very good accuracy after a few iterations (n<20).

Although it was frequency modulation which was derived in the preceding mathematic steps, the method according to the invention is not only suitable for frequency-modulated (FSK) bandpass signals but can also be applied with other modulation methods such as, for example, with a phase modulation (PSK–phase shift keying). For the rest, equations (5a) and (5b), respectively, describe an arbitrarily modulated bandpass signal.

What is claimed is:

1. A method for estimating a frequency offset of a bandpass signal, modulated with a modulation signal, with an assumed carrier frequency in a mobile radio receiver, the method comprising:
   a) determining times of the zero cross-overs of the bandpass signal;
   b) calculating a DC component of an instantaneous frequency based on the times of the zero cross-overs and the assumed carrier frequency, wherein the instantaneous frequency is given by the frequency of the modulated bandpass signal less the assumed carrier frequency; and
   c) estimating the frequency offset from the calculated DC component.

2. A method according to claim 1, wherein for estimating the DC component of the instantaneous frequency, a number of local changes of a phase, which is given by the phase of the modulated bandpass signal less the phase caused by the assumed carrier frequency, are determined between two adjacent times, respectively with the aid of the values of these times.

3. A method according to claim 2, wherein for estimating the DC component of the instantaneous frequency, a number of local changes of the phase between respective adjacent times are added.

4. A method according to claim 2, wherein the local change in the phase between two adjacent times is obtained from the determination of the expression $$\pi - \Omega_0 \cdot (\tau_{j+1} - \tau_j)$$

where $\Omega_0$ is an assumed angular carrier frequency and $\tau_j$ and $\tau_{j+1}$ are two adjacent times of the zero cross-overs.

5. A method according to claim 1, wherein the following steps are performed within step b):
   b1) determining the 0th coefficient of a Fourier series expansion of the instantaneous frequency with the aid of the times of the zero cross-overs, and
   b2) determining the DC component of the instantaneous frequency from the 0th coefficient of the Fourier series expansion of the instantaneous frequency.

6. A method according to claim 5, wherein the $0^{th}$ coefficient of the Fourier series expansion of the instantaneous frequency is determined recursively.

7. A method according to claim 1, wherein, for determining the times of the zero cross-overs,
   the amplitude of the bandpass signal is evaluated with regard to two amplitude states.

8. A method according to claim 7, wherein for evaluating the amplitude of the bandpass signal,
   a limiting amplification of the bandpass signal is performed.

9. A device for estimating the frequency offset of a bandpass signal, modulated with a modulation signal, with an assumed carrier frequency in a mobile radio receiver, comprising:

a zero cross-over detector configured to determine the times of the zero cross-overs of the bandpass signal;

calculator configured to calculate the DC component of the instantaneous frequency based on the times of the zero cross-overs and the assumed carrier frequency, wherein the instantaneous frequency is given by the frequency of the modulated bandpass signal less the assumed carrier frequency; and an estimator configured to estimate the frequency offset from the calculated DC component.

10. A device according to claim 9, wherein the zero cross-over detector comprises a comparator for evaluating the amplitude of the bandpass signal or of an amplified bandpass signal with regard to two amplitude states.

11. A device according to claim 10, wherein the zero cross-over detector comprises a limiting amplifier for amplifying the bandpass signal, the output of which is connected to the comparator.

12. A system for estimating a frequency offset of a bandpass signal, modulated with a modulation signal, with an assumed carrier frequency in a mobile radio receiver, comprising:

a) means for determining times of the zero cross-overs of the bandpass signal;

b) means for calculating a DC component of an instantaneous frequency based on the times of the zero cross-overs and the assumed carrier frequency, wherein the instantaneous frequency is given by the frequency of the modulated bandpass signal less the assumed carrier frequency; and c) means for estimating the frequency offset from the calculated DC component.

13. A system according to claim 12, further comprising means for determining a number of local changes of a phase, which is given by the phase of the modulated bandpass signal less the phase caused by the assumed carrier frequency, between two adjacent times, respectively with the aid of the values of these times.

14. A system according to claim 13, further comprising means for adding a number of local changes of the phase between respective adjacent times.

15. A system according to claim 13, further comprising means for obtaining the local change in the phase between two adjacent times from the determination of the expression $$\pi - \Omega_0 \cdot (\tau_{j+1} - \tau_j)$$

where $\Omega_0$ is an assumed angular carrier frequency and $\tau_j$ and $\tau_{j+1}$ are two adjacent times of the zero cross-overs.

16. A system according to claim 12, wherein the means for estimating further comprise:

b1) means for determining the 0th coefficient of a Fourier series expansion of the instantaneous frequency with the aid of the times of the zero cross-overs, and b2) means for determining the DC component of the instantaneous frequency from the 0th coefficient of the Fourier series expansion of the instantaneous frequency.

17. A system according to claim 16, wherein the means for determining the 0th coefficient of the Fourier series expansion of the instantaneous frequency operate recursively.

18. A system according to claim 12, wherein the means for determining the times of the zero cross-overs evaluate the amplitude of the bandpass signal with regard to two amplitude states.

19. A system according to claim 18, wherein for evaluating the amplitude of the bandpass signal, the means for determining the times perform a limiting amplification of the bandpass signal.

* * * * *